T. E. RITCHIE.
INSERTED TOOTH CUTTER.
APPLICATION FILED AUG. 24, 1917.
1,354,578.
Patented Oct. 5, 1920.
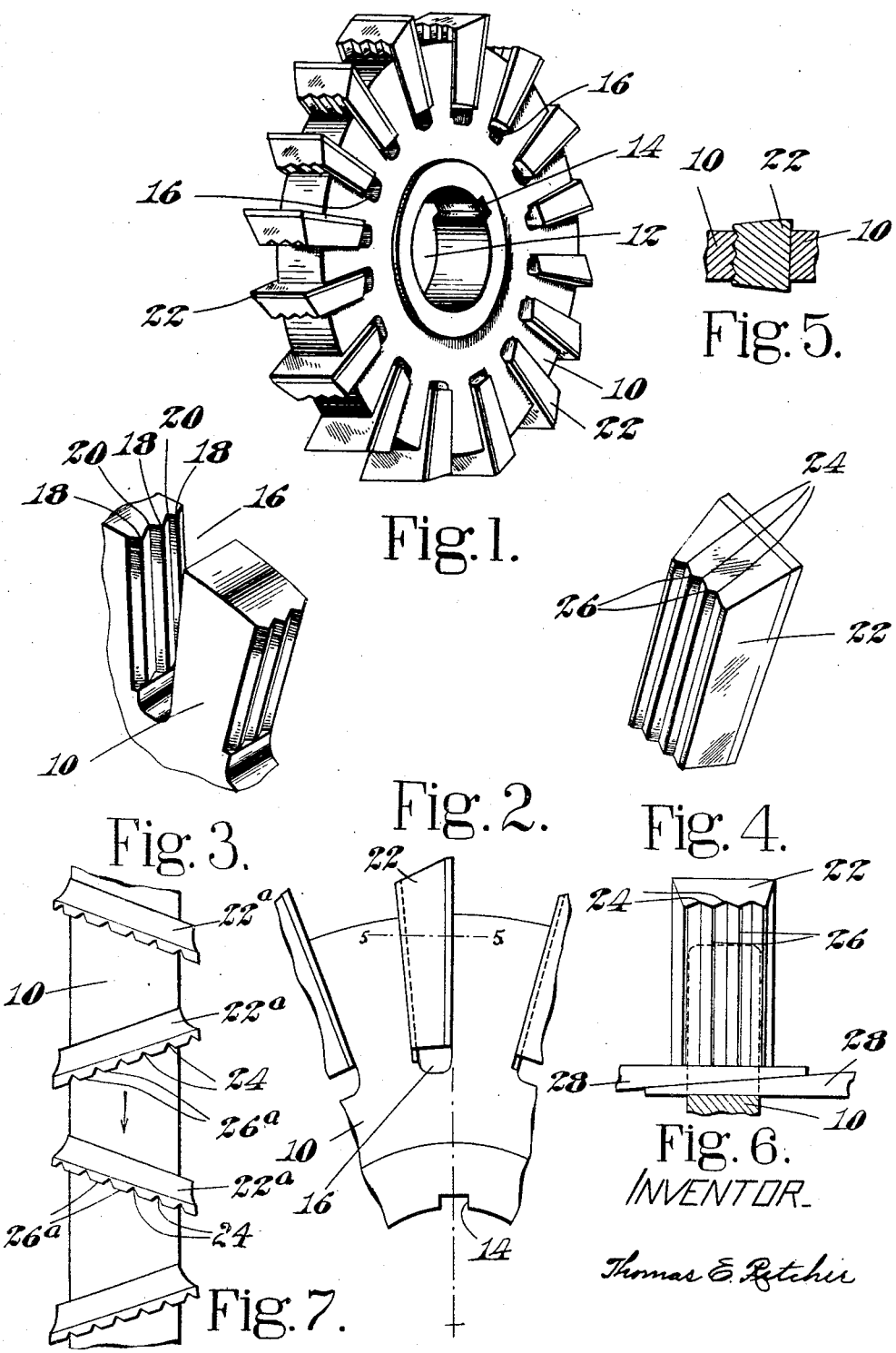
INVENTOR
Thomas E. Ritchie

UNITED STATES PATENT OFFICE.

THOMAS E. RITCHIE, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

INSERTED-TOOTH CUTTER.

1,354,578.     Specification of Letters Patent.     Patented Oct. 5, 1920.

Application filed August 24, 1917. Serial No. 188,007.

*To all whom it may concern:*

Be it known that I, THOMAS E. RITCHIE, a citizen of the United States, residing at Beverly, in the county of Essex and State of Massachusetts, have invented certain Improvements in Inserted-Tooth Cutters, of which the following description, in connection with the accompanying drawings, is a specification, like reference characters on the drawings indicating like parts in the several figures.

This invention relates to cutters and more particularly to cutters having inserted teeth designed for removing metal or other material.

Most cutters are now made from solid stock of so called "high speed" tool steel which, owing to market conditions, is very expensive. Accordingly, an inserted tooth cutter is desirable, as the body portion may be made of inexpensive mild steel, only a comparatively small quantity of high speed steel being required for the cutting members. Furthermore, as the body portions of such cutters require no hardening, they are not warped out of shape nor cracked during manufacture, so that loss from this cause is also eliminated. Many kinds of cutters with inserted teeth have previously been designed but, as they have been relatively complicated and expensive to manufacture, only a few kinds have been used and then only under special conditions.

The general object of this invention is to provide improved and simplified inserted tooth cutters, such as milling cutters, hollow mills, counterbores and others in which the invention can be embodied, which will be less expensive to manufacture than cutters made entirely of a single piece of high speed steel but which will be practically as solid and rigid as cutters made in one piece and as desirable in other respects.

Features of the present invention consist in a novel cutter construction in which the teeth and the body portion are relatively so constructed and arranged that the teeth may be held firmly in position in the body portion without any set screws, pins or other retaining means, the teeth and the body portion of the illustrative construction being held in proper relative position partly by coöperating interlocking surfaces and partly by frictional engagement between surfaces of the teeth and surfaces of the body portion.

In the illustrated construction, the teeth and the recesses are correspondingly tapered at an angle sufficient to retain the teeth frictionally against longitudinal movement while means extend upon both sides of the median or symmetral plane of each tooth to prevent transverse movement in both directions between one surface of each tooth and the corresponding surface of each recess. As shown, one surface of each tooth and the corresponding surface of each recess are formed with one or more interlocking complemental ribs and grooves upon each side of the median plane, and the opposite surface of each tooth and of each recess is smooth and preferably plane. Either of these surfaces of a tooth may be constructed to meet an end surface of the tooth to form an edge that is adapted to be sharpened to a cutting edge. Thus, one of the converging surfaces of each tooth has a greater area per unit of length than the other and the additional surface area serves to increase the holding power of the taper. Furthermore, the arrangement is such that each tooth acts as a locking member to retain the adjacent teeth in position.

The illustrated construction and arrangement not only provide adequately for retaining the teeth against longitudinal displacement by frictional locking engagement of the teeth in the recesses, but the ribbed and grooved surfaces extending upon both sides of the median plane of each tooth insure against even the slightest relative rocking or tipping of the teeth transversely in either direction, even under severe strains, thus overcoming a serious disadvantage in constructions as heretofore made.

An advantage of locating the ribs and grooves on one side or surface only of each tooth and correspondingly on one side or surface only of each recess and in leaving the opposite faces smooth is that the smooth side of each tooth is free to assume, on the smooth complemental surface of its recess, exactly the position determined by the ribs and grooves on the opposite side and the teeth can, therefore, be forced to a firm bearing without straining the ribs and grooves. Such construction also avoids the necessity of having two sets of ribs and grooves for each tooth, all of which would necessarily have to be formed and located accurately relatively to each other. Moreover, as shown, the teeth do not bottom in the recesses, the space between the end of each tooth and the bottom of its recess being preferably sufficiently large to admit of the insertion of an implement between the two to force a tooth readily out of its recess if it is desired to substitute a new tooth.

As it is neither possible nor necessary to have all of the recesses and teeth of absolutely uniform size, there will be a slight variation in the amount that the teeth will extend from the recesses, both longitudinally and laterally. Accordingly, the teeth are not sharpened until all teeth are located in final position, when any variation in length or position of the teeth is corrected during the grinding incident to sharpening the teeth.

An important advantage characteristic of cutters embodying the present invention is that they are very economical to manufacture because extreme accuracy is not necessary in the manufacture of the separate parts thereof and because the teeth are shaped without shoulders or stops so that comparatively little material need be removed from the blanks used in their manufacture, thus economizing both labor and material.

Other features and objects of the invention will be apparent when the following description and claims are considered in connection with the accompanying drawings, in which—

Figure 1 is a perspective view of a milling cutter made in accordance with the present invention;

Fig. 2 is an enlarged side elevation of a portion of the cutter shown in Fig. 1;

Fig. 3 is an enlarged detail view of one of the tapered slots in which the teeth are retained;

Fig. 4 is an enlarged detail view of one of the teeth;

Fig. 5 is a sectional view on the line 5—5 of Fig. 2;

Fig. 6 is a view showing the manner in which a tooth can be removed; and

Fig. 7 is an enlarged front elevation of a modified form of milling cutter embodying the invention and having angularly placed teeth, the teeth being also constructed to break up the chips of metal removed by the cutter.

In Fig. 1 the invention is shown embodied in a side milling cutter of usual form having a body portion 10 provided with a suitable central hole 12 for mounting it on an arbor and provided with the usual keyway 14 for driving it. The body portion 10 is provided with a plurality of recesses, such as the slots 16, for holding the cutting teeth. These slots are tapered and one side of each slot is shown formed with ribs 18 and grooves 20 (Fig. 3). The teeth 22, which fit in the slots, are tapered to correspond to the taper of the slots 16 and they are formed with grooves 24 and ribs 26 (Fig. 4) the ribs and grooves of the slots and of the teeth being mutually complemental to each other so that each will interlock with the other. The teeth are larger than the slots so that, when the teeth are forced into position, they will not quite reach the bottoms of the slots and so that they will project beyond the body portion enough to insure proper cutting action and allow for grinding. Teeth are first inserted loosely in all of the slots and then a slight pressure applied to each tooth of the series in succession. Then a slightly increased pressure is likewise applied and the operation repeated as many times as necessary so that the teeth are pressed inwardly a little at a time in succession. As the teeth are too large to bottom in the slots and as the engaging surfaces are of uniform profile throughout their length, there is nothing to resist this pressure except the friction between the tapered teeth and the tapered slots. Accordingly, the pressing operation is continued until all of the teeth are so firmly located that they will be retained from coming out longitudinally by sufficient and substantially equal friction. Each tooth then acts as a locking member to retain the adjacent teeth in position. The taper must be at a sharply acute angle sufficient to hold securely but from which a tooth may be driven if necessary. The taper which has been found to be suitable in practice has an included angle of 5 degrees and, when such taper is used, it has been found that the total distance that the teeth are pressed inwardly is about one thirty-second of an inch or equivalent to about two one-thousandths of an inch compression of the material.

Because the frictional engaging surfaces of the teeth are of uniform profile throughout their length, the teeth are extremely simple and inexpensive to manufacture, no shoulders being formed thereon so that little material need be removed in their manufacture. The slots are easily cut with a milling cutter having the desired taper, the grooves being afterward cut on the sides of the slots by a slotting machine so as to form the ribs 18 and grooves 20, as shown in Fig. 3. It is desirable to cut these grooves with a slotting tool which has been shaped by the same cutter with which the grooves 24 and ribs 26 on the teeth are formed. The grooves and ribs on both the slots and the teeth will then be practically mutually complemental to each other in shape but, if there happens to be any slight inaccuracy, this is later eliminated by the compression of the comparatively soft stock of the body portion by the teeth so that, when finally in position, the teeth and slots conform exactly with each other.

The ribs 18 and grooves 20 of the slots, by co-acting respectively with the grooves 24 and ribs 26 of the teeth, prevent lateral displacement of the teeth because they effectively prevent transverse movement or strain in both directions between the surfaces upon which they are located. This effectiveness is due to the fact that the means for preventing the transverse movement in both directions, i. e. the ribs and grooves, are located upon both sides of the median plane of each tooth (in this instance, the symmetral plane, i. e. the plane which divides the tooth into two symmetrical parts) and extend across the tooth for substantially its entire width; there being at least one co-acting rib and groove upon each side of said plane. In prior constructions, where it has been attempted to retain the teeth solely by their shape and the coöperating shape of the retaining recesses, by the use of only a single central rib and groove, strain on the tooth could not be resisted effectively because the means employed acted in only a single transverse direction upon each side of the median plane. In addition to preventing lateral displacement of each tooth, the increased surface area of the plurality of ribs and grooves presents considerably more friction surface for retaining the teeth in position longitudinally. It has been found that the form of the ribs and grooves desirable to use is substantially V-shaped with the included angle between the sides greater than 90 degrees and preferably about 130 degrees, although other angles and shapes may be used, without departing from the invention.

It is impossible, in ordinary practice, to manufacture a cutter of this kind with sufficient exactness to have it run true if the teeth are sharpened before insertion. Furthermore, there would be considerable chance of injuring the cutting edge of a sharpened tooth while it was being inserted. Therefore, the cutting edges of the teeth are not sharpened until after all of the teeth are solidly located in final position. As the complete cutters made according to the present invention are substantially like similar cutters made from solid stock as far as their external shape and operation are concerned, they can be accurately sharpened upon the machines used for grinding solid cutters, no special machinery being necessary for this purpose.

If one or more teeth become injured in a cutter of this type, such teeth may be readily removed by placing two wedge-shaped drift pins 28 in the slot underneath the end of the tooth and then forcing the drift pins together, as shown in Fig. 6, or, if more desirable, the bottom of the slot may be made at an angle so that only one drift pin need be used.

In milling cutters it is often desirable to have the teeth placed at an angle to the line of feed and, in many instances, it is desirable to have adjacent teeth located at opposite angles to the line of feed in order to prevent all of the chips from crowding to one side of the cut. Furthermore, it is quite common in milling cutters to cut notches in the cutting edges of the teeth, as such a form of tooth breaks up the chips cut from the material. This notching may be accomplished, without any extra operation, in the manufacture of cutters made according to this invention, by locating the grooves upon the cutting side of the tooth instead of upon the opposite side. In such case, it is desirable to separate the grooves on the teeth sufficiently to leave flattened ribs on the teeth, as shown at 26ª, these flattened portions being staggered in alternate teeth so that the flat of one tooth will cut away the stock left where the notch of the preceding tooth did not cut the material. These several features are all clearly shown by the teeth 22ª in the cutter illustrated in Fig. 7. It will be seen that the invention is such that any desirable location and arrangement of the teeth and grooves can be made to suit best any particular conditions which may be met in practice.

Owing to the lateral retaining power of the grooves, this invention is applicable to quite narrow teeth, so that it can be used successfully in narrow milling cutters or in almost any type of cutting tool for working metal or other materials, such as, for example, hollow mills, counter bores, various special kinds of milling cutters, etc., by using the desired form of body and locating the teeth therein in the position usual for such tool. Therefore, the invention is not limited to the cutters shown and described herein but its scope is limited only as defined in the appended claims, in which the term "cutter" should be understood to include all kinds of cutting implements in which the invention may be embodied.

The term "median plane" is used in the claims to define not only the symmetral plane of the strictly symmetrical teeth shown in Figs. 1 to 6 inclusive, of the drawings, and the corresponding plane that is perpendicular to the ribbed and grooved surface and parallel to the ribs and grooves of the slightly unsymmetrical teeth shown in Fig. 7, but it is also intended to include any equivalent plane in any unsymmetrical form of tooth, the term being used as one of convenience in definition and not as one of limitation.

What I claim as new and desire to secure by Letters Patent of the United States is:—

1. An inserted tooth cutter, having, in combination, a series of teeth and a body portion provided with recesses for the reception of the teeth, said teeth and recesses being correspondingly tapered at an angle sufficient to retain the teeth frictionally against longitudinal movement, one surface of each tooth and the corresponding surface of each recess being formed with at least one interlocking complemental rib and groove upon each side of the median plane of the tooth, and the opposite surface of each tooth and the corresponding surface of the recess being plane.

2. An inserted tooth cutter, having, in combination, a series of teeth and a body portion provided with recesses for the reception of the teeth, said teeth and recesses being correspondingly tapered at an angle sufficient to retain the teeth frictionally against longitudinal movement, one surface of each tooth and the corresponding surface of each recess being formed with at least one interlocking complemental rib and groove upon each side of the median plane of the tooth, and the opposite surface of each tooth and the corresponding surface of the recess being substantially smooth and complemental to each other.

In testimony whereof I have signed my name to this specification.

THOMAS E. RITCHIE.